Sept. 18, 1934.　　　　　E. H. KUHLMAN　　　　　1,973,986

WELDING PROCESS

Filed March 7, 1931

Inventor
Edward H. Kuhlman
By
Karl Bernt

His Attorney

Patented Sept. 18, 1934

1,973,986

UNITED STATES PATENT OFFICE 1,973,986

WELDING PROCESS

Edward H. Kuhlman, Dayton, Ohio, assignor to The National Cash Register Company, Dayton, Ohio, a corporation of Maryland Application March 7, 1931, Serial No. 520,784

2 Claims. (Cl. 219—10)

This invention relates to improvements in electrical welding processes, and more particularly to that branch of electrical welding well known in the art as spot or localized welding by the projection method.

An object of this invention is to provide means for accurately locating and attaching metal pellets or slugs on one or two parts to be united by welding, said slugs furnishing a means for concentrating the welding current in spots to produce what is known as localized or projection welding.

Another object is to provide a method whereby comparatively thick or heavy sheet metal or bar stock parts can be welded to thin sheet metal parts without danger of burning or overheating the thin sheet metal.

Still another object is to provide a method whereby comparatively thick pieces of metal can be welded to pieces of like thickness without danger of overheating or burning either part.

A further object is to provide a method whereby tempered metal pieces of various thicknesses can be united by electrical welding without heating to such a degree that there will be danger of annealing said tempered pieces.

With these and incidental objects in view, the invention includes certain novel features of construction and combinations of parts, the essential elements of which are set forth in appended claims and a preferred form or embodiment of which is hereinafter described with reference to the drawing which accompany and form a part of this specification.

General description

In manufacturing industries where sheet metal parts are united to each other by the electrical process known as projection welding, often used as a substitute for riveting, much trouble has been experienced in getting the small piece of conducting material used to localize the welding current, properly located between the parts to be united, and also in proper relation to the electrodes on the welding machine. The present invention embraces a method whereby the small projections or slugs are properly located in relation to and attached by electrical welding to one of the parts to be later united. This method has several distinct advantages which will be enumerated below.

Broadly this method is accomplished by having the lower electrode of an electrical welding machine recessed at desired intervals to receive and locate slug-like projections. After the slugs have been placed in the recesses, the piece to which these slugs are to be welded is next properly located above and in contact with the slugs. The upper electrode of the welding machine is then brought into contact with the interposed piece, and upon application of the heating current the slugs are welded to the interposed piece. This piece with the slug thus attached is then located in proper relation to the piece to which it is to be united, the two pieces being interposed between the electrodes of a welding machine. Upon contact of the electrodes with the interposed pieces and application of the welding current, the pieces are united at the points where the projecting slugs make contact.

The result is proper distribution and location of the welded spots, and a weld without excessive heating of the parts thus united, which are desirable features to be further explained in the description following.

The number of projections that can be located and attached at one time is limited only by the equipment available. As an example, two slugs are shown being attached simultaneously. This was thought sufficient to illustrate the present method. Neither is it desired to limit the slugs to the size or shape shown, as any convenient size or shape within reasonable limits will serve the purpose equally well. In the detailed description following, the method outlined above will be treated thoroughly.

*Detailed description*

Figure 1:
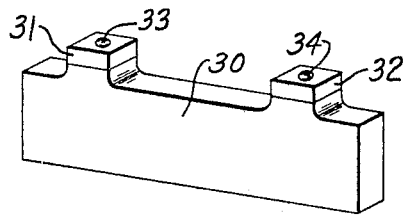
Fig. 1 is a perspective view illustrating the lower electrode of a welding machine having recesses therein for locating welding slugs or pellets.
Figure 2:
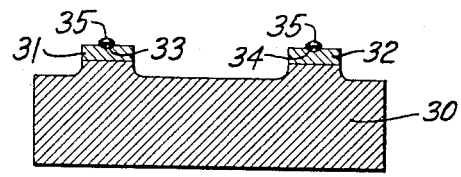
Fig. 2 is a vertical sectional view of Fig. 1 showing the recesses for locating the slugs, with the slugs located therein.
Figure 4:
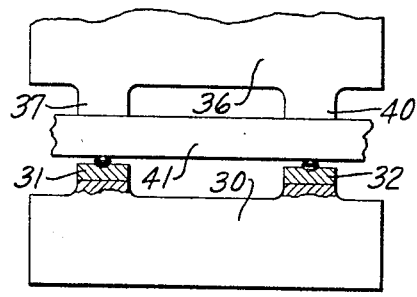
Fig. 4 shows the upper electrode in place, preparatory to the application of the welding current.
Figure 9:
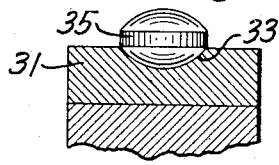
Fig. 9 is an enlarged section of a fragment of a lower electrode showing the locating recess and the welding slug or pellet in place therein.

Referring to Figs. 1 and 2, the lower electrode 30, on a welding machine of any type suited to this class of work, has projections 31 and 32 having recesses 33 and 34 (Figs. 2 and 9) adapted to receive and locate a metal pellet or slug 35. An upper electrode 36 (Fig. 4) of the welding machine, has projections 37 and 40 directly above and in alinement with the projections 31 and 32 respectively of the lower electrode 30, and is arranged to be brought in contact with the work interposed between the electrodes to clamp said work in position and furnish the necessary pressure to secure a good weld when the heating current is applied.

The electrodes may be composed of any suitable metal which is a conductor of electrical current, copper being preferable. The upper part of the projections 31 and 32 containing the slug locating recesses is an alloy metal composed principally of copper and tungsten, and is attached to the electrode proper, which in this case is copper, by silver brazing, the idea being to have the electrode as good a conductor of electricity as possible, and at the same time insure the lasting quality of the recessed slug locating projections.

In some instances, due to the nature of the work to be done, the electrodes are arranged for water-cooling. Also, the machine may be a small hand-operated one, or an automatically operated one where all that is required of the operator after the work is located in the machine is the pressing of a lever which clutches the mechanism to the power source, causes the upper electrode to contact the interposed work, applies the heating current, and finally retracts the upper electrodes after the welding is complete.

Figure 3:
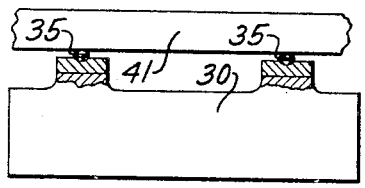
Fig. 3 is a fragmentary illustration of the lower electrode showing the welding slugs and the piece to which they are to be welded in position to receive the welding current.
Figure 5:
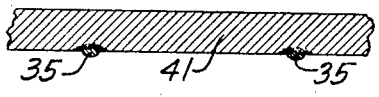
Fig. 5 is a sectional view illustrating how the slugs or pellets are united to a heavy piece of material by the application of the welding current.

For illustrative purposes, let us assume we are using a machine of the latter type. In use the operator places the metal slugs 35 within the locating recesses 33 and 34 (Fig. 2). The metal piece 41 (Figs. 3 and 4), to which the slugs are to be attached, is then located between suitable stops, upon and in contact with the metal slugs. The starting lever (not shown) is now depressed, causing the upper electrode 36 to be brought into contact with the interposed work (Fig. 4), the welding current applied, and finally the upper electrode to be retracted. The result obtained, as shown in Fig. 5, is the uniting of the slugs 35 with the metal piece 41 by welding, so that the slugs actually become a part of the metal piece in the form of projections thereon.

One of the outstanding values of this method is the equal spacing and the locating of the metal slugs in proper relation to the metal pieces to be later united by welding.

Figure 6:
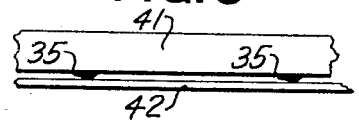
Fig. 6 illustrates the piece shown in Fig. 5, in position to be united to a thin piece of sheet metal.
Figure 7:
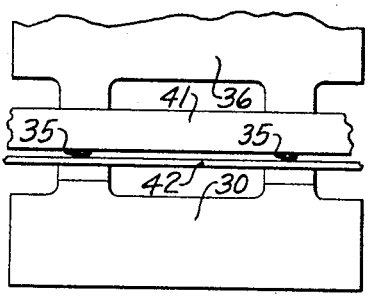
Fig. 7 shows the pieces illustrated in Fig. 6 in place between the electrodes of a welding machine, ready for the application of the welding current.

The next step in this process in the uniting of the piece 41 with the slugs attached, to a sheet metal piece 42 (Fig. 6), and is accomplished in the following manner.

Figure 8:
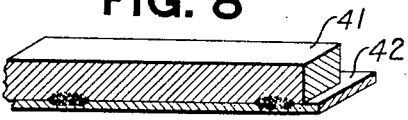
Fig. 8 is a vertical sectional view in perspective of the pieces illustrated in Fig. 6, showing the union formed by the application of the welding current.

The parts 41 and 42 are first properly located in relation to each other between the electrodes of a welding machine, which may, or may not be the same one employed for the attaching of the slugs. The machine is then placed in operation and the previously mentioned cycle is again performed by the machine, whereupon the upper electrode 36 is brought in contact with the parts to be united, the heating current applied, and finally the upper electrode is withdrawn. The result as shown in Fig. 8 is a union of the two parts by a process that is superior to other methods from a standpoint of durability, appearance and production cost.

As mentioned elsewhere in this specification, the slugs or projections cause the welding current to concentrate where they make contact with the parts to be united, which results in the instantaneous heating of the slugs and the metal at the point of contact with the slugs to a welding temperature. This is advantageous in that it requires less current, less time to weld, and does not mar thin sheet metal parts by burning them when they are being united to thick sheet metal or bar stock, the latter being very important in the manufacture of sheet metal cabinets.

Also, in the electrical welding of tempered metal parts of various thicknesses much trouble has been experienced where the old method of spot-welding is employed, in that the amount of heat required to make a good welded union of the parts is such as to cause the tempered pieces to be annealed, and thus render them unsuitable for the work required of them. With this improved method of first welding the slugged projections to one piece and later uniting to another piece by a like process, the heating of the parts for the successive steps is much less than that required by the old method and results in the tempered pieces retaining their hardness, which is very desirable. Likewise it is possible to unite by electrical welding comparatively thick pieces of metal or bar stock without excessive heating of the parts by using this improved method.

When welding two pieces of thick metal the slugs may be placed on one or both pieces to suit the particular conditions arising in manufacture.

While not necessary, it is desirable that the metal slugs be oval-shaped on the contact surfaces to insure good points of contact.

Another reason for welding the projections on the thick pieces, such as "bar stock", etc., is because projections cannot be formed successfully on such "bar stock" by any of the mechanical processes.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. The method of electric welding consisting of placing a pellet in a depression in an electrode, then placing a plate upon the pellet and electrically welding the pellet to the plate, then placing another plate between the pellet and electrode, and finally fusing the two plates and pellet into a homogeneous mass.

2. The method of electric welding consisting of placing a pellet in each of a plurality of spaced depressions in a single electrode, then placing a plate upon the pellets and welding the pellets to the plate in predetermined spaced relationship with each other during a single welding operation.

EDWARD H. KUHLMAN.